(No Model.)
C. H. WANEE.
RIDING ATTACHMENT FOR PLOWS.
No. 261,793. Patented July 25, 1882.
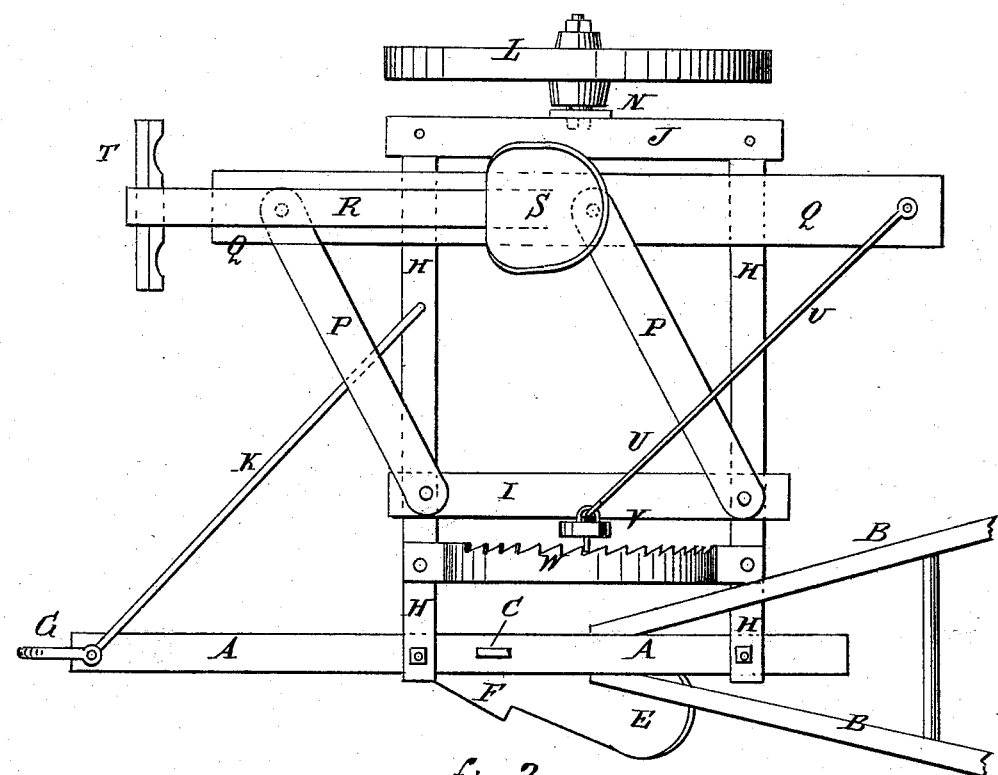
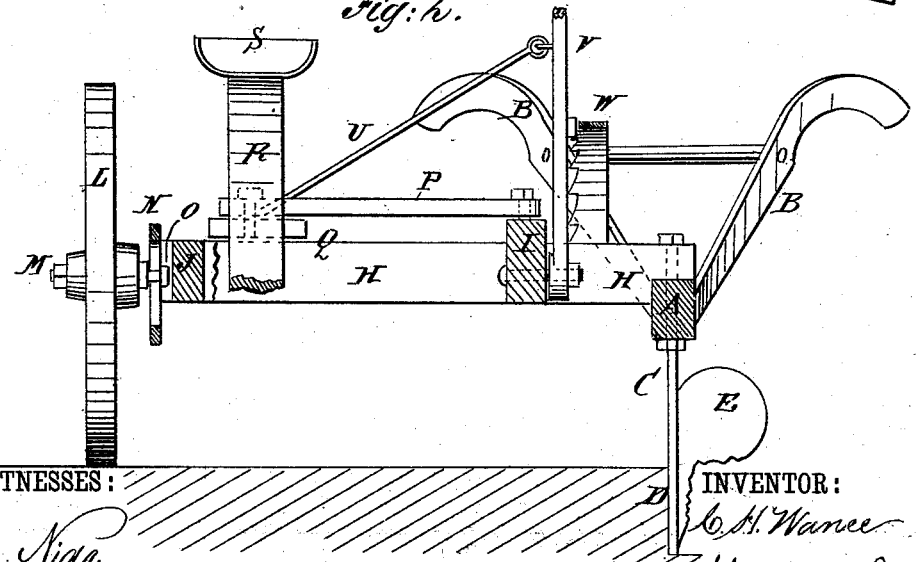

UNITED STATES PATENT OFFICE.

CHARLES H. WANEE, OF LEWISVILLE, INDIANA.

RIDING ATTACHMENT FOR PLOWS.

SPECIFICATION forming part of Letters Patent No. 261,793, dated July 25, 1882.

Application filed November 28, 1881. (No model.)

*To all whom it may concern:*

Be it known that I, CHARLES H. WANEE, of Lewisville, in the county of Henry and State of Indiana, have invented a new and useful Improvement in Riding Attachments for Plows, of which the following is a full, clear, and exact description.

Reference is to be had to the accompanying drawings, forming part of this specification, in which similar letters of reference indicate corresponding parts in both the figures.

Figure 1 is plan view of my improvement shown as applied to a plow. Fig. 2 is a sectional front elevation of the same.

The invention relates to that class of riding attachments for plows that are provided with only one wheel, which runs upon the unplowed land, and has for its object to allow the driver's weight to be used for controlling the plow.

The invention consists in a riding attachment for plows, constructed with a frame and its brace, a vertically-adjustable wheel, and a sliding bar having pivoting-bars and carrying a driver's seat; and, also, in the combination, with the frame, of pivoting-bars, a sliding bar carrying a driver's seat, and a connecting rod and lever, whereby the plow can be controlled and the machine balanced by adjusting the said sliding bar, as will be hereinafter fully described.

A represents the beam, B the handles, C the standard, D the landside, E the mold-board, F the share, and G the draft-clevis, of an ordinary plow.

To the beam A, in front and rear of the standard C, are attached the ends of two bars H, which are connected at a little distance from their inner ends and at their outer ends by cross-bars I J, the bars H I J forming the frame of the attachment. The connection between the frame H I J and the plow-beam A is strengthened by the brace-rod K, the forward end of which is attached to the bolt of the clevis G. The rear end of the brace K is attached to the forward bar, H, between the forward ends of the bars I J. The outer part of the frame H I J is supported by a wheel, L, the inner end of the journal M of which passes through a vertical slot in the plate or hanger N and is secured in place by a nut, O, so that the outer end of the frame H I J can be raised and lowered, as a shallower or deeper furrow is to be plowed, by loosening the nut O. By this arrangement, also, the plow will be held upright when at work.

To the end parts of the bar I are hinged the ends of two parallel bars, P, the outer ends of which are hinged to the bar Q. The bar Q is placed parallel with the bars I J and plow-beam A, and rests and slides upon the bars H.

To the forward end of the sliding bar Q is attached an inclined standard, R, to the upper end of which is attached the driver's seat S. To the lower end of the inclined standard R is attached a foot-rest, T.

To the rear part of the sliding bar Q is attached the outer end of a connecting-bar, U, the inner end of which is pivoted to a lever, V. The lower end of the lever V is pivoted to the outer side of the middle part of the bar I. The lever V moves along the toothed edge of the curved bar W, the ends of which are attached to the end parts of the bars H. The lever V, or a pawl formed upon or attached to the said lever, engages with the teeth of the catch-bar W, so that the lever V will be held securely in any position into which it may be adjusted. With this construction by operating the lever V the sliding bar Q will be moved forward and rearward, the bars P causing the said bar Q to approach the plow-beam when moved forward and recede from the plow-beam when moved to the rearward. By this arrangement the driver's weight, when the bar Q is moved forward and inward, will give the plow a downward pitch, and will cause it to enter the ground deeper; and when the bar Q is moved rearward and outward the driver's weight will raise the point of the plow, and thus cause the plow to work shallower or run out of the ground. The outward and inward movement of the bar Q, when moved forward and rearward, causes the driver's weight to balance the machine.

Having thus fully described my invention, I claim as new and desire to secure by Letters Patent—

1. A riding attachment for plows, constructed substantially as herein shown and described, and consisting of the frame and its brace, the vertically-adjustable wheel, and the sliding bar having pivoting-bars and carrying a driver's seat, and the adjusting rod and lever, as set forth.

2. In a riding attachment for plows, the combination, with the frame H I J, of the pivoting-bars P, the sliding bar Q, carrying the driver's seat, and the connecting-rod U, and lever V, substantially as herein shown and described, whereby the plow can be controlled and the machine balanced by adjusting the said sliding bar, as set forth.

CHARLES HENRY WANEE.

Witnesses:
ROBERT MCDONALD,
J. A. WANEE.